ABSTRACT# United States Patent [19]

Kambara

[11] 4,046,343
[45] Sept. 6, 1977

[54] CABLE TRAY
[75] Inventor: Kyosaku Kambara, Tokyo, Japan
[73] Assignee: Tokyo Tekko Kabushiki Kaisha, Tokyo, Japan
[21] Appl. No.: 701,813
[22] Filed: July 1, 1976
[30] Foreign Application Priority Data
  Dec. 5, 1975  Japan ................... 50-164626
[51] Int. Cl.² .......................... H02G 3/04; F16L 3/22
[52] U.S. Cl. ................... 248/49; 248/68 R; 403/263; 403/338
[58] Field of Search ............ 248/49, 68 R, 58; 174/68 C, 101; 403/244, 245, 262, 263, 338; 292/256; 52/758 C

[56] References Cited
U.S. PATENT DOCUMENTS

| 662,130 | 11/1900 | Mulholland | 292/256 X |
| 2,306,353 | 12/1942 | Cole et al. | 174/101 X |
| 2,321,391 | 6/1943 | Kamin | 52/758 C |
| 2,905,416 | 9/1959 | Wiegand | 248/58 |
| 3,112,093 | 11/1963 | Madl | 248/68 R |
| 3,351,699 | 11/1967 | Merckle | 248/68 R X |
| 3,851,378 | 12/1974 | Dessert | 248/49 X |
| 3,915,420 | 10/1975 | Norris | 243/68 R X |
| 3,938,767 | 2/1976 | Norris | 248/68 R X |

FOREIGN PATENT DOCUMENTS

| 2,226,606 | 11/1974 | France | 248/49 |
| 1,323,088 | 7/1973 | United Kingdom | 248/49 |

Primary Examiner—Roy D. Frazier
Assistant Examiner—Rodney H. Bonck
Attorney, Agent, or Firm—James E. Nilles

[57] ABSTRACT

A cable tray comprising a cover plate, side plates arranged opposite to each other, the one of said side plates being provided with openings at its lower side, supporting frames of which both ends are inserted into the openings and means for fixing every several supporting frames to the side plates. The lower end of each of said side plates is bent outwards and at right angle to form a supporting face, of which outer end is further bent upwards to form an engaging face. Said openings are arranged to have a certain distance in the longitudinal direction of the side plate and corresponding to those provided at the lower side of the other of said side plates. The upper end of each of said side plates is bent outwards and at right angle to form a flange, on which the side portion of the cover plate is overlapped, and these overlapped cover plate and flange are sandwiched between the pressing faces of a fastening means.

1 Claim, 5 Drawing Figures

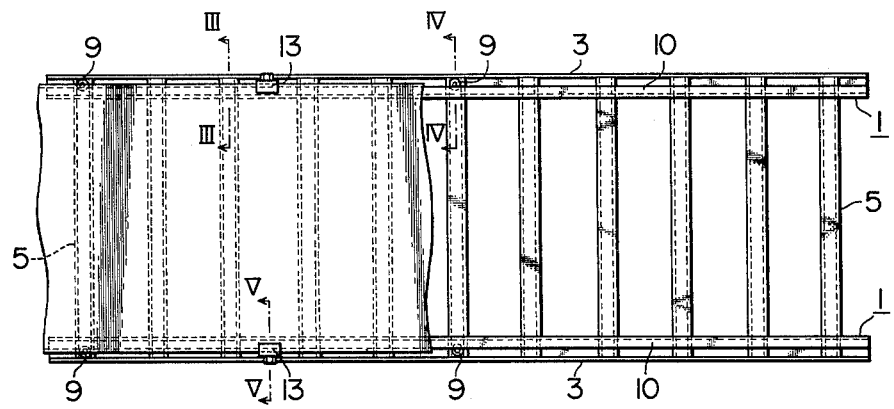
FIG. 1
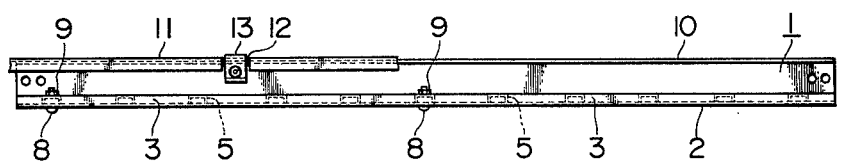
FIG. 2
FIG. 3
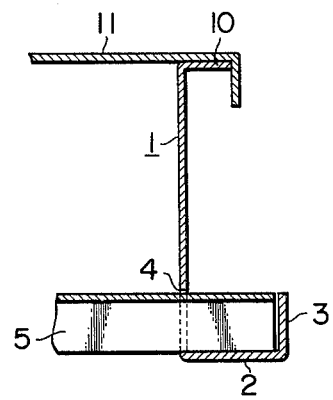
FIG. 4
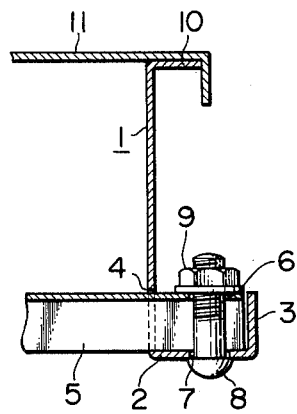
FIG. 5
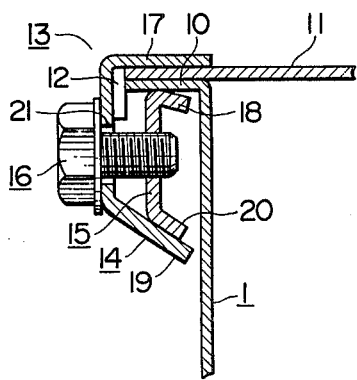

CABLE TRAY

The present invention relates to a cable tray for supporting a plurality of cables.

There have been conventionally used cable trays wherein a plurality of cover plates and frames for supporting cables are fixed by means of fastening members such as bolts and nuts, respectively, to the upper and the lower ends of side plates arranged opposite to each other.

It has been needed in these conventional cable trays that every supporting frame is fixed to the side plates, resulting in such drawbacks that bolts and nuts to be used are too many and that the assembly of the supporting frames to the side plates is not efficient.

For the purpose of fixing the cover plates to the side plates it is a must that the bores provided in the cover plates are right aligned with the corresponding bores provided in the side plates. However, the more the cover plates to be used become increased, the greater the total of the pitch error between every adjacent bores becomes, so that the bores provided in the cover plates are not aligned with the corresponding bores provided in the side plates to thereby make it more difficult to pass the bolts therethrough. Further, the material of which the cover plates are made is so thin a plate that it is susceptible to natural deformation or deformation at the coating process thereof, thus causing the problem of pitch error to become remarkable.

Accordingly, a primary object of the present invention is to provide a cable tray capable of enhancing the efficiency of fixing the supporting frames to the side plates and reducing the number of bolts and nuts to be used.

Other object of the present invention is to provide a simple cable tray capable of solving the problem caused at the time of fixing the cover plates to the side plates and preventing any flaws from being caused at the time of fastening.

These and other objects as well as the merits of the present invention will be apparent from the following detailed description with reference to the accompanying drawing, in which FIG. 1 is a plane view, partly broken showing an embodiment of the present invention;

FIG. 2 is a side view showing the embodiment shown in FIG. 1;

FIG. 3 is a sectional view taken along the line III — III in FIG. 1;

FIG. 4 is a sectional view taken along the line IV — IV in FIG. 1; and

FIG. 5 is a sectional view taken along the line V — V in FIG. 1.

In the Figures numeral 1 represents side plates arranged at a certain distance and opposite to each other. The lower portion of each of the side plates is bent outwards and at right angle to form a supporting face 2 and the outermost end of the supporting face 2 is further bent upperwards and at right angle to form an engaging face 3.

Rectangular openings 4 are provided with a certain distance therebetween at the lower portion of the side of each of the side plates opposite to each other, said openings of the one of the side plates corresponding to those of the other, and through the openings 4 corresponding to each other are inserted both ends of a supporting frame 5 to be supported by the supporting faces 2. In case the supporting frame 5 is, for example, of "L" shape, its both ends are inserted through the openings 4 in such a manner that its flat side is located top so as to enable cables to be supported thereon.

There is no need for fixing every supporting frame 5 to the side plates 1. The fixing of the supporting frames 5 to the side plates 1 is carried out every four or five supporting frames 5. Namely, every fourth or fifth supporting frame 5 is fixed to the side plates 1 by inserting bolts 8 from the underside of the side plates 1 into bores 7 provided in the supporting faces 2 thereof and bores 6 provided at the both ends of the supporting frame 5, respectively, and screwing nuts 9 onto the bolts 8 from the upside of the supporting frame 5.

As a result, the supporting frames 5 arranged between the ones thus fixed are limited in their movements in the traverse direction as well as in the forward- and backward directions by the engaging faces 3 and by the openings 4 of the side plates 1.

The other upper end of each of the side plates 1 is bent outwards and at right angle to form a flange 10, and a cover plate 11 of reversed "U" shape is mounted on the flanges 10 of the side plates 1. The cover plate 11 is provided with cut-away portions 12 at its both sides and a fastening means 13 is attached to each of the cut-away portions 12.

The fastening means 13 comprises a first and a second fastening metal members 14 and 15 similar to each other, and a fastening screw rod 16 which slides the second fastening metal member 15 to and from the first one 14. One ends of the first and the second fastening metal members 14 and 15 are bent at right angle to form pressing faces 17 and 18 while the other ends thereof are slanted to form sliding faces 19 and 20. The pressing face 18 of the second fastening metal member 15 is of arc shape at its outer end so that the members to be fastened may be easily inserted between the pressing faces 17 and 18.

The second fastening metal member 15 is screwed onto the fastening screw rod 16 passed through a hole 21 which is provided in the side of the first fastening metal member 14. According to the extent at which the fastening screw rod 16 is screwed into the second fastening metal member 15, the latter slides along the sliding face 19 of the first fastening metal member 14 and in the right or left direction relative to the member 14 so as to change the space between the pressing faces 17 and 18 of the both members 14 and 15.

Accordingly, the cover plate 11 is fixed to the side plates 1 by sandwiching between the pressing faces 17 and 18 of the fastening means 13 the flange 10 of each of the side plates 1 and the side portion of the cover plate 11 which are overlapped each other and by screwing the fastening screw rod 16 so as to make narrower the space between the pressing faces 17 and 18.

As described above, the present invention allows the supporting frames 15 and the cover plates 11 to be easily fixed to the side plates 1.

What is claimed is:

1. A cable tray comprising:
   a cover plate having downwardly depending side portions;
   a pair of side plates arranged opposite to each other, the upper end of each of said side plates being bent outwards and at a right angle to form a flange on which a side portion of the cover plate is overlapped, the lower end of each of said side plates being bent outwards and at a right angle to form a supporting face, the outer end of said supporting face being further bent upwards to form an engaging face, both of said side plates being provided with openings at their lower sides, said openings being arranged to have a predetermined distance therebetween in the longitudinal direction of the side plates, the openings provided on one said side plates corresponding to the openings provided on the other of said side plates;

supporting frames having both ends thereof inserted into registering openings in said side plates and each end of a supporting frame resting on a supporting face;

means for fixing at least some of said supporting frames to said supporting faces;

and fastening means comprising a first fastening member of which one end is bent at right angle to form a pressing face and of which the other end is slanted to form a sliding face, a second fastening member similar to said first fastening member and having a pressing face and a sliding face, and a fastening screw passing through a hole provided in said first fastening member and being screwed into a hole in said second fastening member, the overlapped cover plate and flange being sandwiched between the pressing faces of said first and second fastening members.

* * * * *